Aug. 8, 1967  A. L. BARRETT  3,334,686
GAS PURIFYING APPARATUS
Filed Feb. 26, 1965
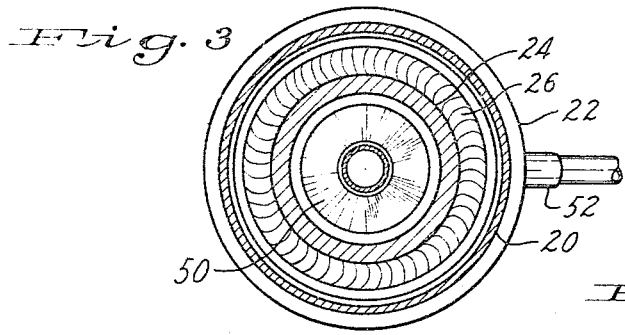
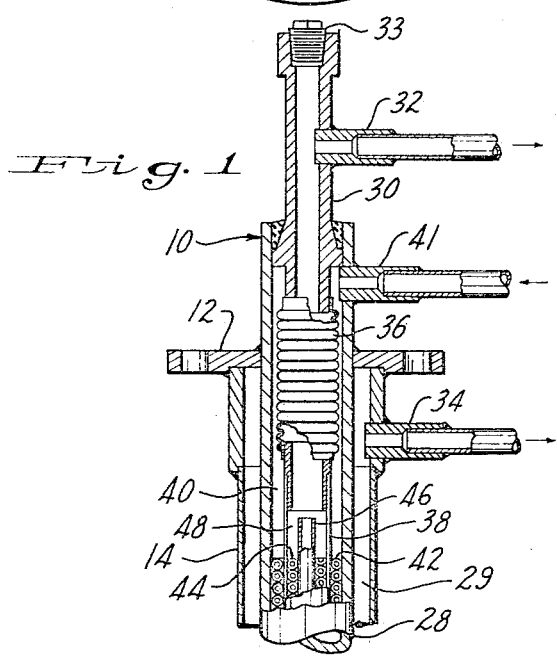
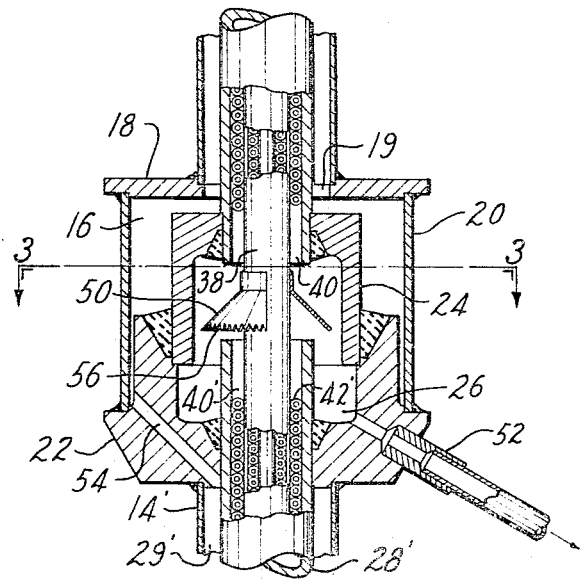
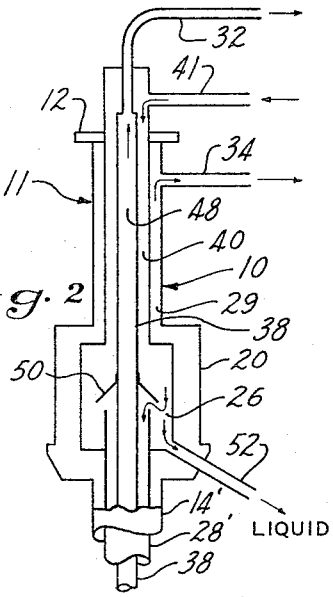
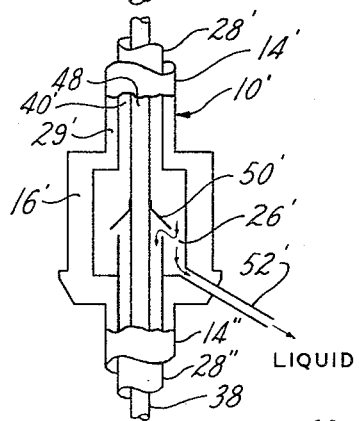
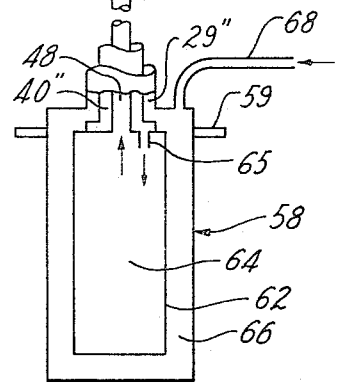
INVENTOR.
ARTHUR L. BARRETT
BY United States Patent Office 3,334,686
Patented Aug. 8, 1967

3,334,686
GAS PURIFYING APPARATUS
Arthur L. Barrett, Michigan City, Ind., assignor to Joy Manufacturing Company, Pittsburgh, Pa., a corporation of Pennsylvania
Filed Feb. 26, 1965, Ser. No. 435,584
3 Claims. (Cl. 165—155)

This invention relates to a gas purifier and more particularly to a regenerative arrangement of heat exchangers in which a mixture of gases containing condensable impurities is cooled through successive stages of heat exchangers with drainage provided for liquified portions of the condensable impurities at points within the exchangers preceding temperature stages in which such liquid would become frozen with consequent blockage of the heat exchange channels.

Heat exchangers for the liquefaction of condensable impurities are well known in the art and have served the purpose but have been unsatisfactory under certain conditions of operation because the liquefied impurities were carried into successively colder passageways until they solidified or froze within the passageways and built up to finally block the colder passageways.

In the device of the present invention such blockage of passageways is avoided by providing for drainage of the condensed gas in liquid form from portions of the exchangers situated between the stages of the exchangers so that each drain follows an exchanger portion operating in a range of temperature causing condensation of the condensable impurity and preceeds portions of the exchangers operating at temperatures low enough to cause solidification of the condensed impurity.

A specific example of the usefulness of the device of this invention is the purification of hydrogen to a level of impurities of perhaps one half part of impurities per million parts of hydrogen wherein a gas purifier of the molecular sieve type operating at a temperature of one hundred degrees Kelvin or less is used for the production of high purity hydrogen.

Operation of the device of this invention will be described with reference to the removal of water and butane from hydrogen prior to its being purified by a molecular sieve but such description should not be taken as limiting upon the usefulness of this invention since variations in the size and temperature of operation of the device of this invention would make it applicable to similar purifications of helium or nitrogen gases or the like.

It is therefore an object of this invention to provide a new and improved gas purifier.

It is another object of this invention to provide a new and improved gas purifier wherein provision is made for draining off condensed impurities in liquid form.

It is a further object of this invention to provide a new and improved gas purifier comprising a series of heat exchanger portions operated at successively lower temperatures with liquid drains interposed between certain of the heat exchanger portions to provide for draining off liquid condensed in the proceeding portion of the heat exchanger before the gas to be purified is conducted into a portion of the heat exchanger at a temperature low enough to cause solidification of such liquid.

It is still another object of this invention to provide a gas purifier having a series of multiple channel regenerative heat exchangers having at least an inner and an outer passageway with the outer passageway being used for inflow of a gas having condensable impurities mixed therein and wherein the outer passageway passes through successive zones maintained at lower and lower temperatures and wherein at a point in such outer passageway where the temperature is just above the freezing point of a given condensable impurity the outer passageway is interrupted by a relatively large chamber in which is positioned a deflecting means so positioned that the condensed liquid will be diverted into a drainage pocket from which it can be drained out of the system without progressing into the zones of the exchanger wherein the temperature is below the freezing point of such liquid.

It is another specific object of this invention to provide a gas purifier having a series of multiple channel regenerative heat exchangers of the coaxial tube type having at least an inner, an intermediate and an outer tube forming corresponding passageways therebetween with the intermediate passageway being used for inflow of the gas such as hydrogen having condensable impurities mixed therein and wherein the intermediate passageway passes through successive zones at lower and lower temperatures and wherein at a point in such intermediate passageway where the temperature is just above the freezing point of a given condensable impurity the intermediate passageway is interrupted by a relatively large chamber in which is positioned an inverted funnel surrounding and fastened to the innermost tube and extending outwardly farther than the outer edge of the intermediate tube so the condensed liquid will strike the upper surface of the inverted funnel and be diverted into a drainage pocket from which it can be drained out of the system without progressing into the zones of the exchanger wherein the temperature is below the freezing point of such liquid.

These and other objects and advantages of this invention will become more fully apparent upon consideration of the following description and drawings in which:

FIG. 1 is a fragmentary sectional view of a heat exchanger constructed according to the principles of this invention;

FIG. 2 is a schematic representation of a gas purifying system utilizing at least two of the heat exchangers of FIG. 1; and FIG. 3 is a sectional view taken substantially on line 3—3 of FIG. 1.

In FIG. 1 there are shown two fragmentary portions of a heat exchanger generally indicated at 10 constructed according to the principles of this invention and comprising: a disc-shaped generally horizontal support element 12 having suitable vertical bores therethrough to provide for securing the support element 12 to suitable support means (not shown). Extending downwardly from the support element 12 as viewed in FIG. 1 is an elongated outer tubular member 14 rigidly secured to and supported by the support element 12 and having at its lower end a chamber 16 communicating with the interior of the tubular member 14 and covered by a disc member 18 rigidly secured to the bottom end of the tubular member 14 and having a central bore 19 therein through which the aforesaid communication takes place. The chamber 16 is further surrounded by a short tube portion 20 of larger diameter than the outer tubular member 14 rigidly secured to the bottom surface of the disc member 18 and extending downwardly with its lower edge rigidly secured to a flange formed on the outer surface of a cup-shaped body member 22 which forms the bottom of the chamber 16.

Rigidly secured within the central cavity of the body member 22 is an inverted cup-shaped member 24 in fluid tight relationship with the body member 22 and forming therewith a chamber 26 for the collection of condensed liquid as will hereinafter appear. The inverted member 24 has a central axial bore in which is rigidly secured in fluid tight relationship an intermediate tubular member 28 coaxial with and extending upward within the outer tubular member 14 and further extending through the support element 12 in fluid tight relationship and provided at its upper end with a top end tubular member 30 provided with a side connection 32 and blocked at its outer end as by a plug 33. The coaxial members 14 and 28 form a passageway 29 therebetween communicating through an upper side portion of the tubular element 14 with a side connection 34 and through the bore 19 with the chamber 16 hereinbefore described.

Extending downwardly within the upper portion of the intermediate tubular member 28 is a portion of the top end member 30 rigidly secured in fluid tight relationship to an elongated hollow bellows-type flexible member 36 which is in turn secured to and internally communicates with an elongated inner tubular member 38 extending downwardly within the intermediate member 28 and coaxial therewith. The flexible member 36 provides for differential linear expansion of the tubular members 28 and 38 in case they are made of different materials or whenever they are at different temperatures, respectively. The coaxial members 28 and 38 form a passageway 40 therebetween in which is located an extended surface helically disposed coil member 42 as more particularly described and illustrated in U.S. Patent 2,680,357. As set forth in the above cited patent the coil member 42 is placed in the passageway 40 for the purpose of providing extended surface to facilitate heat exchange between gas flowing through the passageway 40 and the walls 28 and 38 of the passageway 40. Within the inner tubular member 38 a second extended surface coil member 44 is helically disposed about a hollow tubular mandrel 46 inserted within the inner coil member 44 to hold the coil 44 in position coaxial with the inner tubular member 38 and forming a passageway 48 between the mandrel 46 and inner tubular member 38. It is to be noted that other types of extended surface packing such as crinkled foil and the like can be used in place of the coil members 42 and 44 for the same purpose. The mandrel 46 may be tubular as shown and plugged at one end or it may be an open tube providing for some flow of gas in conjunction with the passageway 48 with which it communicates or if desired it may be a solid rod depending on the thermal characteristics necessary to accomplish a particular amount of cooling.

The mandrel 46, the inner tubular member 38 and the inner coil member 44 extend downwardly without interruption through all of the heat exchange elements of this device while the intermediate tube 28 and the coil member 42 are ended at the inner bottom surface of the inverted member 24 where the passageway 40 communicates with the chamber 46 only to be recommenced as tubular member 28' and coil member 42' extending downwardly from an intermediate portion of the chamber 26 centrally through the bottom of the body member 22 in which the tube 28' is rigidly secured in fluid tight relationship therewith.

Within the upper intermediate portion of the chamber 26 and rigidly secured to the inner tubular member 38 is an inverted funnel-shaped roof-type liquid deflecting means or drain member 50 surrounding the inner tubular member 38 and extending obliquely outwardly and downwardly therefrom beyond the outside diameter of the intermediate tubular member 28' so that any liquid formed in the passage 40 will strike the upper surface of the drain member 50 and being conducted downwardly and outwardly along the upper surface thereof will drip from the lower edge of the member 50 into the bottom of the chamber 26 from which it is continuously drained off through an obliquely downwardly extending side drain connection 52 communicating with the bottom of the chamber 26.

In like manner the outer tubular member 14 is interrupted by the disc member 18 and the chamber 16 but recommences as outer tubular member 14' rigidly secured to and extending downwardly from the body member 22 forming the passageway 29' between the outer tubular member 14' and the intermediate tubular member 28'.

The passageway 29' communicates with the chamber 16 through a plurality of obliquely upwardly extending bores 54 so that the passageway 29' becomes an extension of the passageway 29 through the chamber 16.

The bottom edge of the drain member 50 is toothed or serrated as at 56 so that liquid draining from the upper surface of the drain member 50 will flow more or less uniformly in discrete streams from points all around the periphery of the member 50 rather than coalescing into a more or less continuous sheet of liquid as might happen with a smooth bottom edge. Drops of liquid at this point have the advantage of greater tendency to fall directly to the bottom of the chamber 26 rather than being deviated by gas flow as a sheet or stream might be with some of the liquid being carried into the passageway 40' where it would freeze and ultimately block the passageway. A further desired effect of the serrations is to concentrate the liquid flow into discrete streams of liquid occupying only a small percentage of the periphery of the drain member 50 thus allowing freer flow of gas from the chamber 26 into passageway 40'. In cases where greater velocity of gas flow is present the serrations 56 can be elongated to the point where they reach the inside surface of the cup-shaped member 24 to provide a continuous drainage path. Another envisioned variation comprises a shield element behind each serration within the bottom periphery of the drain member 50 and extending downwardly therefrom to prevent gas flow from disturbing the liquid flow. A still further improvement in the separation of gas from liquid within the chamber 26 can be achieved by positioning turning vanes in the lower portion of the passageway 40 to impart a spinning motion to the gas entering the chamber 26 whereby centrifugal forces will aid in the separation. It is to be noted that the passageway 40 between the tubular members 28 and 38 communicates with a side connection 41 for a purpose to be described.

In FIG. 2 there is schematically shown a gas purifying apparatus 11 comprising the heat exchanger 10 as described above in series with another very similar heat exchanger generally indicated at 10' which is constructed on the same principles and includes a drain member 50' very similar in design and function to drain member 50 of FIG. 1 and a side drain connection 52' communicating with the bottom of a liquid collection chamber 26' in all respects similar to the chamber 26 of FIG. 1. The upper portion of the lower heat exchanger 10' is formed by continuations of the tubular members 38, 28' and 14' together with the passageways 48, 40' and 29' formed thereby as described with relation to FIG. 1. Continuations of these same members indicated at 14", 28" and 38 extend downwardly from the heat exchanger 10' to a suitable reactor vessel generally indicated at 58 provided with a radially extending mounting flange 59 which in conjunction with the support element 12 engaged with suitable support brackets (not shown) supports and positions the purifier apparatus 11 in a manner well known in the art. The reactor vessel 58 is a closed housing having positioned therewithin a purifier 62 of the molecular sieve type which is in turn a closed vessel defining a reaction chamber 64 wherein suitable elements (not shown) for the purification of a gas by catalytic or physical removal of impurities are positioned. These internal elements are so arranged that a flow of gas entering the chamber 64 through an inlet connection 65 communicating with the passageway 40" which is the ultimate continuation of passageway 40 is forced to circulate downwardly throughout the space within the chamber 64 before returning upwardly and exiting from the chamber 64 through the passageway 48 within the inner tubular member 38 communicating with the side connection 32 as hereinbefore described.

Within the reactor vessel 58 but external to the purifier 62 there is formed a chamber 66 communicating with a side connection 68 for a purpose to be described. The chamber 66 also communicates upwardly with the passageway 29″ which is the ultimate continuation of the passageway 29 and is formed by the tubular elements 14″ and 28″ between the heat exchanger 10′ and the reactor vessel 58.

In the above description it is to be noted that where ever the same reference numeral is used, whether plain or primed or double primed, continuous communication from one to the other of the passageways having the same reference numeral is indicated.

*Operation*

The above described purifier 11 is designed as a preferred embodiment of this invention for the purification of hydrogen containing in addition to trace impurities significant amounts of butane and water vapor with the elements within the purifier vessel 62 designed to operate at a temperature of approximately 100° Kelvin in removing the trace impurites.

To begin the operation the side connection 68 is connected to a supply of liquid nitrogen at a temperature somewhat below 100° Kelvin which liquid nitrogen is supplied to the chamber 66 surrounding the purifier vessel 62 and allowed to boil off therein with the gasified nitrogen exiting from the chamber 66 through the passageways 29″, the chamber 26′, the passageway 29′, the chamber 26 and the passageway 29, in series, to finally exit through the side connection 34 to a place of further utilization of the gaseous nitrogen or to a refrigeration system (not shown) to be reliquefied and supplied to the side connection 68 in a continuation of the cooling process. As the purifier vessel 62 cools down a body of liquid nitrogen begins to build up within the reactor vessel 58 and the level of this body of liquid is maintained at a suitable height either manually or by automatic level control devices (not shown) so that the purifier vessel 62 is constantly surrounded by liquid nitrogen. When the purifier elements within the chamber 64 have been cooled to their suitable operating temperature hydrogen from a source of hydrogen (not shown) connected to the side connection 41 is caused to flow downwardly through the passageway 40, the chamber 26, the passageway 40′, the chamber 26′, the passageway 40″ and through the inlet 65 into the chamber 64 where it is purified and reversing direction travels outwardly through the passageway 48 within the inner tubular member 38 to exit from the side connection 32 to a place of storage or use of the purified hydrogen.

The hydrogen gas exiting from the chamber 64 is at a temperature of approximately 100° Kelvin, and as it passes upwardly through the passageway 48 within the inner tubular member 38 through the action of the extended surface coil members 44 and 42 is enabled to absorb heat from the incoming gas in the passageways 40, 40′ and 40″ so that the incoming gas is progressively cooled as it flows downwardly and enters the chamber 64 through the inlet 65 at a temperature suitable for the reaction within the molecular sieve elements in the chamber 64. Additional cooling of the incoming hydrogen is provided by the gasified nitrogen flowing upwardly through passageway 29″, 29′ and 29, which flow also provides insulation from ambient temperatures and absorbs heat leakage or heat of reaction anywhere in the circuit. It is to be noted that other means and methods of insulating and providing additional refrigeration without the use of tubular member 14 or passageway 29 can be applied within the scope of the present invention.

By careful design and control of the rate of gas flow, the temperature drop within the heat exchanger 10 is regulated so that the chamber 26 remains slightly above the freezing point of water at the pressure existing within the chamber 26. One method of temperature control involves the use of the interior of the mandrel 46 as a bypass for a controlled portion of the outflowing hydrogen. As a result of the reduction of temperature within the passageway 40 the water condenses out of the incoming stream of hydrogen and forms drops of droplets which strike the upper surface of the drain members 50 and coalesce into drops of water on the serrations 56 from which by gravitational action the water falls into the bottom of the chamber 26 and is drained off through the side drain connection 52 and disposed of in any suitable manner. The flow of gas from the passageway 40 flows around the drain member 50 and enters the passageway 40′ within the tubular member 28′ and continues downwardly at lower and lower temperatures caused by the cooling effect of the outgoing hydrogen until its approaches the drain member 50′ within the chamber 26′ at a temperature just above the freezing point of butane. As the incoming gas in the passageway 40′ becomes progressively cooler its temperature falls below the condensation point of butane and liquid droplets of butane begin to form in the passageway 40′. By suitable controls the temperature of the chamber 26′ is regulated so that it remains slightly above the freezing point of butane under the pressure within the chamber 26′ and again droplets of liquid striking the drain member 50′ coalesce as drops on the serrations at the lower edge of the drain member 50′ and form drops which by gravitational action fall to the bottom of the chamber 26′ and are drained off through the side drain connection 52′ to a suitable place of recovery or disposal as desired. The inflowing gas through the passageway 40′ flows around the drain member 50′ and enters the passageway 40″ through which with suitable further cooling it passes downwardly into the chamber 64 for completion of the purification at a temperature of approximately 100° Kelvin as desired.

It is to be noted that although the above operation has been described with relation to the removal of water and butane from hydrogen other gases such as, for instance, helium and nitrogen can be purified by the same method and other liquefiable impurities removed by heat exchangers designed according to the principles of this invention although such heat exchangers might well be of different size, shape and capacity to provide the requisite temperature just above the freezing point of the respective liquefiable impurities in that portion of the heat exchanger where the drain members and the liquid collection chambers are placed.

It is to be further noted that a rectangular exchanger using flat plates to define passageways 40 and 48 and one or more sloping rectangular plates in place of the drain member 50 can be used in accomplishing the purposes of this invention.

This invention having been described with reference to a particular embodiment it is to be appreciated that other embodiments are envisioned and contemplated which fall within the scope of this invention. It is therefore respectfully requested that this invention as described in the claims appended hereto be interpreted as broadly as possible and be limited only by the prior art.

What is claimed is:

1. A gas purifier comprising: a hollow body member defining a chamber; a first tubular member of a given diameter smaller than said body member extending upwardly from said body member; a second tubular member of said given diameter extending downwardly from said body member from a point intermediate said chamber and downwardly spaced from the bottom end of said first tubular member; a third tubular member having a diameter smaller than said given diameter and extending coaxially downward through said first and second tubular members and said chamber and defining a continuous passage therebetween and therethrough; a fourth tubular member coaxial with said third tubular member, extending axially within said third tubular member and defining a second continuous passage therewith; extended surface packing means located in the portions of said first and second passages defined by said tubular members; liquid deflecting means supported by and surrounding said third tubular member at a point within said chamber upwardly spaced from said second member and extending outwardly beyond said second member to deflect all liquid descending from above said deflecting means; and drain means communicating with said chamber for removing liquid therefrom.

2. A gas purifier comprising: a hollow body member defining a chamber; a first tubular member of a given diameter smaller than said body member extending upwardly from said body member; a second tubular member of said given diameter extending downwardly from said body member from a point intermediate said chamber and downwardly spaced from the bottom end of said first tubular member; a third tubular member having a diameter smaller than said given diameter and extending coaxially downward through said first and second tubular members and said chamber and defining a continuous passage therebetween and therethrough; a fourth tubular member coaxial with said third tubular member, extending axially within said third tubular member and defining a second continuous passage therewith; extended surface packing means located in the portions of said first and second passages defined by said tubular members; liquid deflecting means supported by and surrounding said third tubular member at a point within said chamber upwardly spaced from said second member and extending outwardly beyond said second member to deflect all liquid descending from above said deflecting means; drain means communicating with said chamber for removing liquid therefrom; and means surrounding said first and second tubular members to form continuous passageway means thereabout.

3. A gas purifier comprising: elongated first means defining first passageway means; second means defining with said first means at least a second passageway and having a portion forming a transversely enlarged chamber surrounding an intermediate portion of said first means; third means cooperating with a lower portion of said first means to form at least a third passageway extending downwardly from an intermediate portion of said chamber to a point below the bottom of said chamber; extended surface heat exchange means located in said first passageway, said second passageway, and said third passageway; liquid deflecting means supported by a portion of said first means within said chamber, said deflecting means being upwardly spaced from the top end of said third means and extending outward beyond said third passageway to deflect all liquid descending from above said deflecting means; fourth means defining a fourth passageway communicating with said first passageway at spaced locations to provide for gas flow by passing at least a portion of said heat exchange means in said first passageway and a drain connection communicating with said chamber for removing liquid therefrom.

References Cited
UNITED STATES PATENTS

| | | | |
|---|---|---|---|
| 1,020,102 | 3/1912 | Von Linde | 62—23 |
| 1,020,103 | 3/1912 | Von Linde | 62—23 |
| 1,040,886 | 10/1912 | Claude | 62—23 |
| 1,152,119 | 8/1915 | Place | 62—18 |
| 1,813,637 | 7/1931 | Powers | 55—391 X |
| 2,680,357 | 6/1954 | Collins | 62—175 |
| 2,720,936 | 10/1955 | Beu | 55—80 |
| 3,006,435 | 10/1961 | Alton et al. | 55—39 X |

REUBEN FRIEDMAN, *Primary Examiner.*

J. ADEE, *Assistant Examiner.*